United States Patent
McGuire

(10) Patent No.: US 6,745,108 B1
(45) Date of Patent: *Jun. 1, 2004

(54) ROBOTIC PAINT/SURFACE COATING REMOVAL APPARATUS

(75) Inventor: Dennis McGuire, Stuart, FL (US)

(73) Assignee: UltraStrip Systems, Inc., Stuart, FL (US)

( * ) Notice: Subject to any disclaimer, the term of this patent is extended or adjusted under 35 U.S.C. 154(b) by 8 days.

This patent is subject to a terminal disclaimer.

(21) Appl. No.: 10/300,320

(22) Filed: Nov. 19, 2002

(51) Int. Cl.[7] .................................................. B08B 3/02
(52) U.S. Cl. ........................ 700/291; 134/18; 134/38
(58) Field of Search ......................... 700/159; 134/18, 134/38, 57

(56) References Cited

U.S. PATENT DOCUMENTS

| | | | |
|---|---|---|---|
| 4,182,000 A | 1/1980 | Fairbairn | |
| 4,443,271 A | 4/1984 | Goerss | |
| 4,466,851 A | 8/1984 | Hoffman | |
| 4,858,264 A | 8/1989 | Reinhart | |
| 5,468,178 A | 11/1995 | Kitko et al. | |
| 5,954,890 A | 9/1999 | Smith et al. | |
| 5,986,234 A | 11/1999 | Matthews et al. | |
| 6,013,308 A | 1/2000 | Saito | |
| 6,287,389 B1 * | 9/2001 | McGuire | 134/18 |
| 6,402,857 B2 | 6/2002 | Clark et al. | |
| 6,413,322 B1 | 7/2002 | Kopaskie | |

* cited by examiner

*Primary Examiner*—Leo Picard
*Assistant Examiner*—Alexander Kosowski
(74) *Attorney, Agent, or Firm*—McHale & Slavin, P.A.

(57) ABSTRACT

The present invention provides a computerized apparatus and method for stripping paint/surface coatings from manufactured components by utilizing ultra-high pressure waterjet technology in conjunction with a method and apparatus for creating and storing, in a database, digitized maps or templates which conform to the shape of a manufactured component. The stored shapes may be retrieved as needed and used to drive a precision ultra-high pressure waterjet nozzle constructed and arranged for removal of the painted finish or surface coating from the desired surface.

5 Claims, 2 Drawing Sheets

ROBOTIC PAINT/SURFACE COATING REMOVAL APPARATUS

FIELD OF THE INVENTION

This invention relates to a method and apparatus for removing paint/surface coating from a manufactured component for assembly, finishing or resurfacing via the utilization of a computer controlled robotically manipulated ultra-high pressure waterjet.

1. Background of the Invention

Many raw materials used in manufacturing require surface coatings to aid in the manufacturing process. Finished products that reach the consumer often have surfaces coated with paint, varnish, shellac, or numerous other protective coatings. It is highly likely that sometime during the life of these products at least some of their components will need a surface coating to be removed for application of a different surface coating.

From the mills, metals are often coated with corrosion or oxidation inhibitors to protect the material during shipping and storage. Many manufacturing processes require the protective coating on the raw material to be removed in order to apply a different coating. Die lubricants, cutting fluids, waxes, layout dyes and other coatings are often to materials during different stages of the manufacturing process. These surface coatings must be removed from the manufactured component prior to assembly or applying surface coatings such as paint to the final product.

After manufacturing, many products or components require resurfacing due to age, oxidation, personal preference, normal wear or defects in the original or existing surface coating. Generally, in order to properly resurface these products/components it is necessary to strip the original or existing coating from the substrate.

However, stripping the broad diversity of surface coatings available from the numerous substrate materials currently used in manufacturing has presented quite a challenge to manufacturers and consumers alike. Currently, a combination of hazardous chemicals, abrasive blasting and scraping or sanding by hand have been employed to adequately remove a surface coating without damaging the substrate.

Solvents are one type of technology used to strip away surface coatings. Solvent-based chemical stripping has typically accomplished the removal of coatings such as alkyd primers, alkyd topcoats, acrylic nitrocellulose topcoats, grease, oil, machining fluids and waxes from metallic manufactured components.

However, the environmental and worker health problems associated with using chemical strippers are of epidemic proportions. Chemical strippers typically contain methylene chloride, chlorinated solvents, caustics, peroxides or similar chemicals as a major component, and the use of these materials is now restricted or prohibited by OSHA/EPA as toxic or ozone depletion materials.

As a result, all of the major automobile manufacturers have issued disclaimer notices to their dealerships that prohibit the use of chemical strippers and outline that the only approved method for stripping the paint/surface coating from their automobiles is by using a single edge razor blade.

Chemical strippers are also inappropriate for the removal of protective coatings from non-metallic organic matrix composite materials, for example rubber, plastic, carbon fiber and fiberglass as well as others. Chemical cleaners or strippers typically cannot be used for surface coating removal from such composite materials because of the high risk of the stripper chemically attacking organic components of the material.

One alternative to the use of chemical stripping is the use of abrasive blasting techniques. Techniques which include the utilization of abrasive media such as crushed corn cobs, glass beads, plastic beads, walnut shells, synthetic diamond dust, garnet particles, and dry ice carbon dioxide pellets have been employed in abrasive blasting stripping processes.

However, it is often undesirable to use an abrasive blasting process because the erosive nature of abrasives may contaminate or damage the surface being stripped. The abrasive also creates additional hazardous waste requiring proper disposal.

Another alternative to chemical stripping is high pressure waterjets. High pressure waterjets have been used successfully for cleaning as well as removing a variety of surface coatings. However, the current techniques are labor intensive and attempts at automation require extended set-up time and have met with limited success.

Accordingly, a cost-effective and versatile arrangement utilizing three dimensional mapping for robotically manipulating ultra-high pressure waterjets to safely and effectively remove paint/surface coatings from the inner and outer surfaces of manufactured components without injuring the underlying substructure would satisfy a long felt need in the art.

2. Description of the Prior Art

U.S. Pat. No. 6,413,322 discloses a machine for removing greases, oils and machining fluids in a atmosphere container, using an inert gas to purge the oxygen in the container and a heat source to vaporize the flammable chemical degreasing fluid.

U.S. Pat. No. 6,402,857 discloses a non-flammable, non-corrosive and non-hazardous chemical solvent mixture and a method of cleaning an article in a vapor degreaser using the chemical solvent mixture. Oil, grease, rosin and flux can be readily removed using the chemical mixture.

U.S. Pat. No. 5,954,890 discloses a composition and method for removal of polymeric coatings especially suited for the nonporous surfaces of airplanes. The method comprises the mixing of two stock solutions, a peroxide/acid solution and an alkaline solution. The mixture is then immediately applied to a surface to be stripped of coating. The applied mixture causes the coating to become softened. A further step of washing or blowing with water, air, cornstarch, or plastic media will remove the softened coating.

U.S. Pat. No. 4,182,000 teaches a hand held scraper-sander, as does U.S. Pat. No. 4,466,851 which teaches a hand held scraper that is especially suited for removing fragments of a gasket from automobile engine components.

U.S. Pat. No. 5,468,178 discloses a paint removing adapted for attachment to a hand held rotary grinder for fast, efficient removal of paint from a surface. The device includes a disc with abrasive platelets arranged in a ring around the periphery of the disc, leaving a central area free from abrasive particles. Rotation of the disc at high speeds removes paint from the entire area encompassed by the disc.

U.S. Pat. No. 4,443,271 concerns an apparatus and method used for cleaning floor grates employing high-pressure water jets.

U.S. Pat. No. 4,858,264 is directed toward an ultrasonic assisted protective coating removal system, particularly for removing paint or similar coatings from aircraft.

U.S. Pat. No. 5,986,234 teaches a laser-based coating removal system for removal of surface coatings.

U.S. Pat. No. 6,013,308 discloses a method for removing coating defects from a vehicle body. The surface defect is marked by an operator, who then must target the marked surface position as well as specify a working plane. The patent makes no disclosure or suggestion of utilizing a computer containing three dimensional information about vehicle body or automotive components to accurately control the removal of surface coatings.

U.S. Pat. No. 6,287,389 issued to the present inventor discloses the removal of paints from an automobile surface solely by the use of ultra-high pressure waterjets using a robotically controlled system of operation.

None of the prior art patents address the issue of utilizing three dimensional mapping for robotically manipulating ultra-high pressure waterjets for precision removal of surface coatings and contaminates from the inner and outer surfaces of manufactured components.

SUMMARY OF THE INVENTION

The present invention provides a computerized method useful for cleaning or stripping surface coatings and contaminates from the inner and outer surfaces of manufactured components. This device utilizes ultra-high pressure waterjet technology in conjunction with a method and apparatus for creating and storing, in a database, three dimensional digitized maps or templates which conform to the shape of the manufactured component or product. The stored shapes may then be retrieved as needed and used to drive a robot for manipulating an ultra-high pressure waterjet nozzle constructed and arranged for precision removal of unwanted coatings and contaminates from the component's inner and outer surfaces. The device is capable of selectively removing surface coatings and contaminates from a broad array of manufactured components without damaging the substrate material. For example, the device is capable of but should not be limited to stripping paint/surface coatings from substrate materials such as ferrous and non-ferrous metals, rubber, plastic, glass, fibreglass, carbon fiber, concrete, stone, wood and combinations thereof.

A single operator positioned outside the stripping booth at a computer console can easily strip layers of paint/surface coating from one type of manufactured component, and then switch to another type of manufactured component having a different paint/surface coating and substrate with minimal set-up time. The operator merely chooses, scans or downloads a shape from the computer that is capable of storing and recalling three-dimensional images. He thereafter selects a pressure from 25,000–60,000 psi. based on the substrate material and the surface coating being stripped. The computer then sends a signal to the robot to start the designated program to follow the contours of the component. The robotic arm is movable along the inner and outer surface contours of the manufactured component at a predetermined distance therefrom. Each robot is provided with an arm having a wrist that is program controlled and carries a rotating nozzle similar to a showerhead. The rotating nozzle contains one or more ultra-high pressure waterjets and is movable in up to five control axes. The rotating nozzle directs ultra-high pressure water toward the component for selectively removing one or more layers of a surface coating such as paint, varnish, shellac, grease, oil, wax, cutting fluid, dirt or other organic/inorganic contamination from the desired surface of the manufactured component. By adjusting the pressure and the standoff distance the present invention is capable of selectively stripping away various layers of paint/surface coatings from the manufactured component or from selected areas of the manufactured component without damaging the underlying substructure.

Accordingly, it is an objective of the instant invention to provide an ultra-high pressure water assisted paint/surface coating removal method and apparatus.

It is a further objective of the instant invention to provide a paint/surface coating removal apparatus which operates with a degree of precision sufficient to selectively remove one or more layers of pain/surface coating without damage to underlying substructure.

It is yet another objective of the instant invention to provide an apparatus and method for removal of paint/surface coating wherein the apparatus and method utilize a computer for storing three-dimensional automotive component shapes in a structured database, and a computer driven coating removal device for precision and selective removal of one or more layers thereof.

It is another object of the present invention to provide a versatile paint/surface coating removal arrangement which can have up to five axes of manipulation.

It is another object of the invention to provide a versatile paint/surface coating removal arrangement which can quickly and easily recall and switch manufactured component shapes to minimize required set-up time.

It is another object of the invention to provide a paint/surface coating removal arrangement which is suitable for use in combustible or other hazardous environments.

It is another object of the invention to provide a paint/surface coating removal arrangement which is safe for use with respect to the environment and with respect to human operators.

It is still a further object of the present invention to provide an apparatus and method for paint/surface coating removal wherein the method includes the step of progressively adding new manufactured component shapes to the database; including the steps of downloading archived manufactured component shape digitized files or alternatively photographing the manufactured component and scanning the photograph to digitize the image for downloading, and utilizing the digitized shape to direct the paint/surface coating removal via ultra-high pressure liquid.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
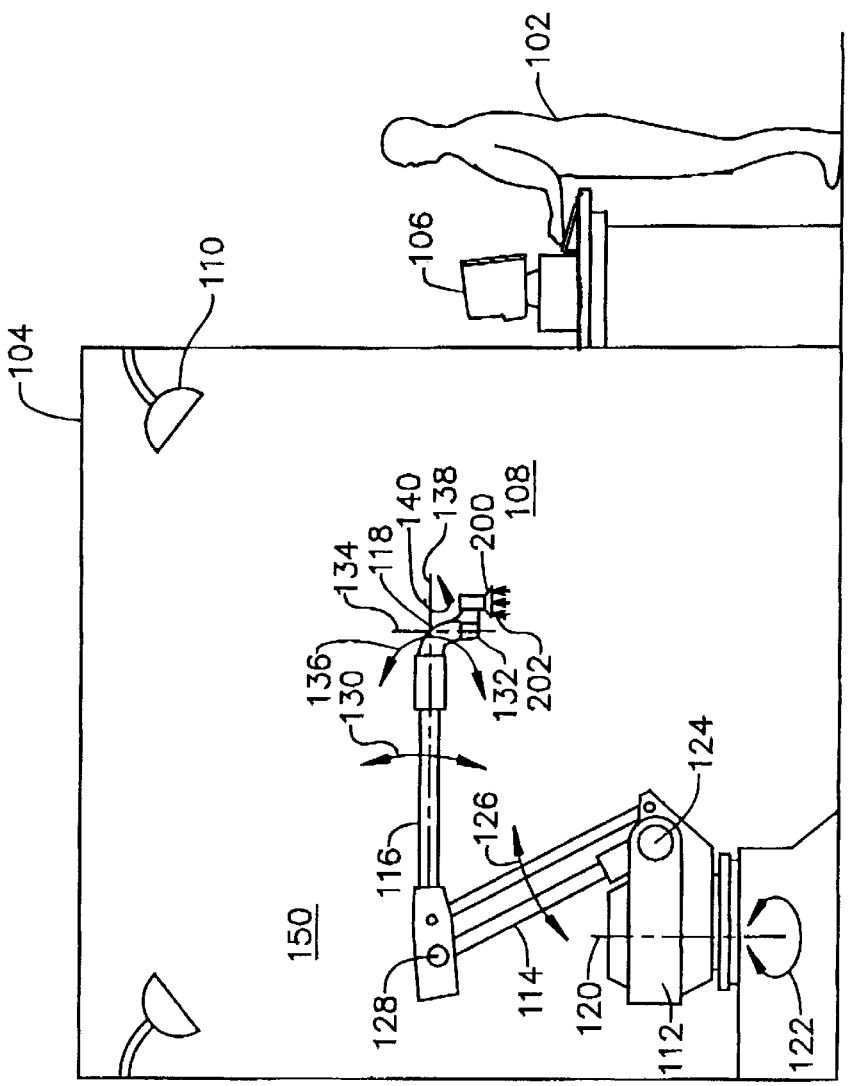
FIG. 1 illustrates a robotically controlled articulating arm paint/surface coating removal system.

In order to alleviate the propensity for surface damage from abrasive blasting and due to the unsuitability of chemical stripping agents for paint/surface coating removal from manufactured component materials, the present invention utilizes a robotically controlled articulating arm paint/surface coating removal system 100 as set forth in FIG. 1.

In accordance with FIG. 1, a single operator 102 is positioned outside a stripping booth 104 at a computer console 106. In one embodiment, a manufactured component 108 is placed or conveyed into the booth. The operator 102 first scans the manufactured component with an array of imaging equipment 110 that is constructed and arranged to obtain a three-dimensional digitized image of a component's surface. The imaging equipment 110 is capable of mapping the areas of the manufactured component to a very high degree of accuracy. The program control is achieved through a program control unit (not shown) which is to be located outside the stripping booth and includes a built in microcomputer for selectively actuating drive means (not shown) operatively associated with the base 112, primary arm 114, secondary arm 116, and wrist 118 for achieving prescribed movements of the ultra-high pressure water nozzle 200 about the five control axes. In this regard it will be noted that the base 112 is supported for controlled rotation about a first axes 120 in a rotary path 122 while the primary arm 114 is movable about a pivotal connection which provides a second axes 124 and movement in a curved path 126. The secondary arm 116 is pivotally supported at the upper end of the primary arm 114 and is movable about a pivotal connection which provides a third axes 128 which allows movement in a curved path 130. The wrist 118 is supported at the free end of the secondary arm 116 and carries the support head 132 which is moveable relative to the second arm 116 about a fourth axes 134 which allows movement in a curved path 136 and is also rotatable about the longitudinal axis 138 of the secondary arm 116 in the rotary path 140. The control of the robot 150 is provided by a computer based controller 106, which is capable of receiving various electrical input signals and generating output signals for initiating the operation of the robot in accordance with a desired sequence of operation. Robots providing programmed control movement about multi-axes as described are commercially available and well known in the art.

Figure 2:
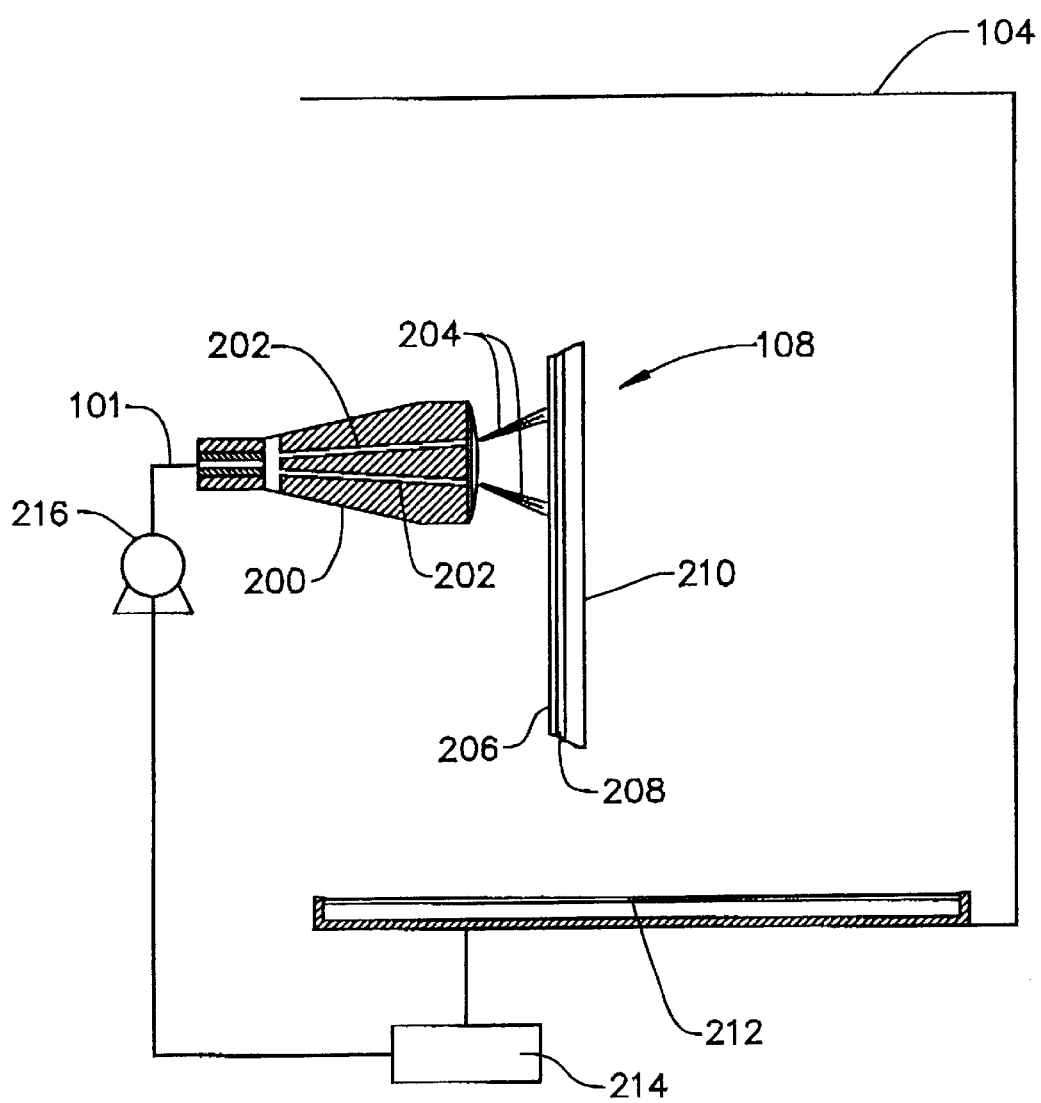
FIG. 2 illustrates the ultra-high pressure water nozzle paint/surface coating removal system.

In accordance with FIG. 2, a rotating nozzle 200, in mechanical engagement with robot 150 (FIG.1), and having a multiplicity of waterjets 202 similar to a showerhead rotating, is maintained at a controlled distance from the surface of a manufactured component. The action of ultra-high pressure liquid 204, directed through the waterjets and impinging upon the component's surface, acts to selectively remove one or more layers of paint/surface coating 206 without otherwise injuring the underlying substrate 210. The stripped paint/surface coating and liquid falls to a grated floor 212 within the stripping booth 104 and is directed to a bank of filters 214 that capture the paint chips and if needed a skimmer (not shown) for removing oils to recycle clean liquid in a closed loop back to the high pressure pump 216.

The pressure of the liquid can vary from 25,000–60,000 psi, depending on the volume of liquid and pressure used and the standoff distance from the manufactured component being stripped. Greater pressures allow further standoff distances. The preferred embodiment has a minimal liquid flow of 1–3 gallons per minute at 30,000–60,000 psi.

In practicing the invention, the manufactured component 108 is placed into the stripping booth 104. The operator selects the proper manufactured component concerned. The controller then commands at least one robot 150 to start its particular program for stripping the surface coating from the desired portion of the manufactured component 108. The robot 150 or alternatively a plurality of robots then provides movement for the water nozzles 200 about the five control axes of each robot.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A method as practiced on a computer for removing paint/surface coating from the inner and/or outer surfaces of a manufactured component comprising:

providing a computer having a structured database containing stored digitized shapes of the surfaces of manufactured components;

providing a device for selectively removing one or more layers of paint/surface coating with ultra-high pressure waterjets; said device controlled by said computer;

selecting one of said stored digitized shapes to direct said device about said manufactured component surface; and selecting said ultra-high pressure between 25,000 and 60,000 pounds per square inch to remove one or more layers of paint/surface coating;

whereby removal of the paint/surface coating via ultra-high pressure water is accomplished.

2. A method as practiced on a computer for removing paint/surface coating from the inner and/or outer surfaces of a manufactured component of claim 1 further comprising:

obtaining a digitized image of a surface of a manufactured component by scanning said surface of said manufactured component;

downloading said digitized image to said computer;

said computer comparing said downloaded image to said stored images and selecting an image from said stored images matching said manufactured component; and directing said device about said manufactured component.

3. A method as practiced on a computer for removing paint/surface coating from the inner and/or outer surfaces of a manufactured component of claim 1 further comprising:

rotating said ultra-high pressure waterjets of said device.

4. A method as practiced on a computer for removing paint/surface coating from the inner and/or outer surfaces of a manufactured component of claim 1 further comprising:

scanning a manufactured component with a damaged surface and creating a digitized image of said damaged surface to said computer; and downloading said digitized image of said damaged surface to said computer; and directing said device about said damaged surface of said manufactured component.

5. A method as practiced on a computer for removing paint/surface coating from the inner and/or outer surfaces of a manufactured component of claim 4 further comprising:

comparing said downloaded digitized image of said damaged surfaces with said stored images;

selecting said damaged surface of said downloaded digitized image; and directing said device about said damaged surface.

\* \* \* \* \*